Dec. 3, 1935.          J. SCHAAF          2,022,901
PROCESS FOR CLARIFICATION OF SEWAGE AND DISPOSAL OF SAME
Filed March 24, 1932    2 Sheets-Sheet 1

INVENTOR
John Schaaf.
BY
ATTORNEY

Dec. 3, 1935. J. SCHAAF 2,022,901
PROCESS FOR CLARIFICATION OF SEWAGE AND DISPOSAL OF SAME
Filed March 24, 1932 2 Sheets-Sheet 2

INVENTOR
John Schaaf
BY
ATTORNEY

Patented Dec. 3, 1935

2,022,901

UNITED STATES PATENT OFFICE 2,022,901

PROCESS FOR CLARIFICATION OF SEWAGE AND DISPOSAL OF SAME

John Schaaf, Buffalo, N. Y.

Application March 24, 1932, Serial No. 600,903

4 Claims. (Cl. 210—196)

This invention relates to an improved method or process for clarifying raw sewage or untreated liquid and one object is to filter the liquid through filtering material and a movable screen, the solids being deposited on the filtering material and continuously removed with a top layer, or all, of said filtering material.

Another object is to chemically treat and clarify a sewage sludge which would otherwise pass through the plain screen.

Another object is to treat the resultant solids and filtering medium for further disposal so as to destroy the sawage solids and recover the filtering material or medium, or to use the sewage solids as a fertilizer.

With these and other objects which will appear as the description proceeds, the invention will be more particularly pointed out in the appended claims.

In the drawings which are presented to show a practical application of my process:

Figure 2:
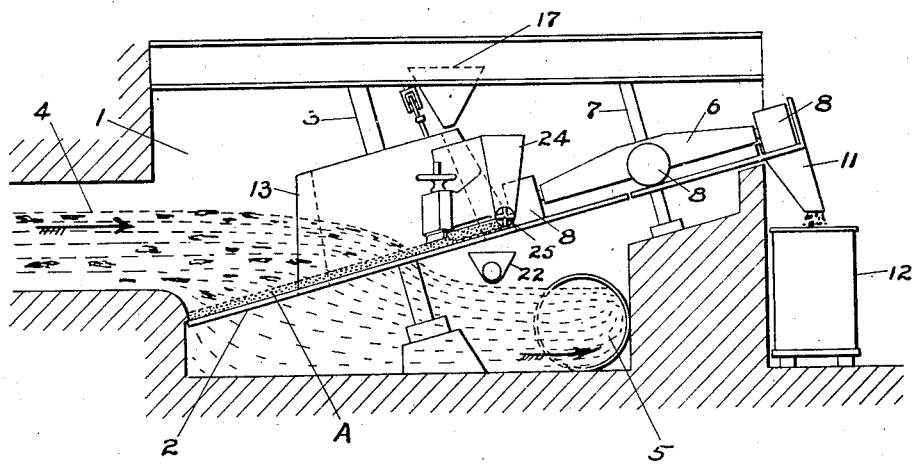
Fig. 2 is a side elevation of said screen with the sewer walls in section and showing the filtering medium and the path of flow of the sewage stream.
Figure 3:
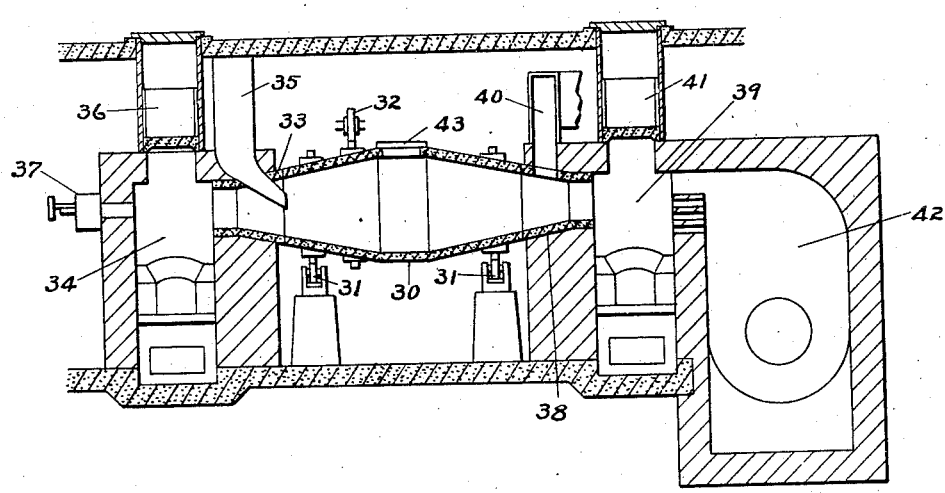
Fig. 3 is a sectional elevation of a rotatable drum or retort mounted between firing chambers for the reduction or burning of sewage, garbage, refuse, etc.
Figures 4, 5, 6:
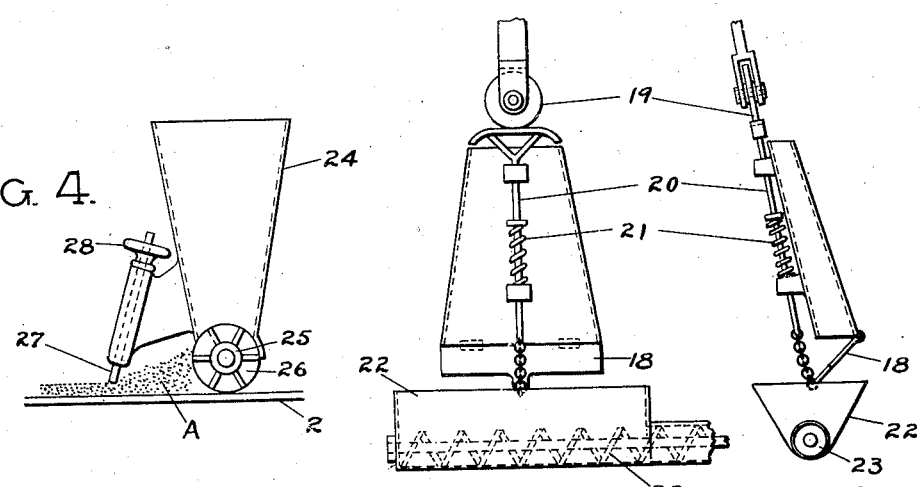
Fig. 4 is an enlarged and an end elevation of the hopper shown in Figs. 1 and 2 for spreading filtering material or medium on a movable screen.
Figs. 5 and 6 are elevations of one of the sections of the cone screen shown in Figs. 1 and 2 to illustrate manner of removing filtering material.
Figure 7:
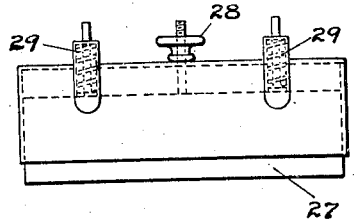
Fig. 7 is a side elevation of the blade for spreading the filtering material as in Fig. 4 and to show the means for adjusting said blade to obtain desired thickness of filtering material.

In the figures, 1 is a chamber in which a flat screen 2, mounted on a shaft 3 is slowly rotated. The screen 2 can be placed horizontally or tilted at an angle to the influent 4 as shown in Fig. 2, but in any case it is so located in the line of the sewer as to intercept the entire flow and with a relatively submerged portion about as shown. 5 is the effluent flowing from chamber 1 and A the filtering material.

6 is a spider mounted on shaft 7 and rotated at the proper speed relative to the speed of screen 2 so the rotating brushes 8 sweep the accumulated sewage solids 9 with a layer of filtering medium from said screen 2 into a trough 10 from which it dops through spout 11 into ejector pot 12.

13 is a screen in the form of a truncated cone mounted concentrically on the center of screen 2 and also turning with it. 44 is a rotating brush to sweep the solids from the outer surface of said screen cone 13 and on to the flat screen 2.

The cone 13 is formed with an inner screen 14 also having the form of a truncated cone and separated from the outer surface by means of partitions 15. The sections 16 thus formed are filled with filtering material A from the hopper 17. As a means of discharging the filtering material A and the accumulated solids from each section 16, a hinged plate 18 is provided at the bottom and actuated by a roller 19 which can be lowered to depress the rod 20 connected to said plate 18. The rod 20 is retracted by a spring 21 to raise the plate 18 when the section 16 has passed the roller 19.

The discharged material drops into a trough 22 to be carried away by screw 23 and deposited into an ejector pot (not shown). The filtering material A in each section 16 can be changed as occasion requires or on each rotation of the screen, as the filling and discharging occur when said section is in its upper position and out of water.

The hopper 24 for feeding a filtering medium A on to the flat screen 2 is supported from the beams above it (supports not shown). A rotating gate in the form of a roller 25 divided into radial chambers 26 is rotated by its shaft to feed the filtering medium A from the hopper 24 on to screen 2 in the desired quantity and the blade 27 spreads the said medium to the desired thickness. Blade 27 is regulated for height by the nut 28. The springs 29 hold blade 27 down to the limit set by nut 28 but also allow said blade to rise to clear obstructions.

The incinerator shown is of the rotary drum or retort class in which 30 is the drum mounted on rollers 31 and driven by a gear 32. The retort or drum 30 is hollow and tapering toward each end, the ends abutting housings built into the adjacent wall of a firing chamber. 33 is the housing built into and communicating with the interior of the firing chamber 34. 35 is a charging chute passing through the side of housing 33 and into the end of retort 30 to feed sewage, screenings or whatever material is to be dehydrated or burned in said retort. Chamber 34 has a charging hopper 36 to feed rubbish or material to be burned. 37 is an oil burner in chamber 34. 38 is the housing built into and communicating with the interior of a second firing chamber 39, said housing communicating with a passage 40 to carry the moisture and odors to a condenser. 41 is a charging hopper for chamber 39. 42 is a combustion chamber which can be maintained at a high temperature to burn the gases and smoke when the dehydrated material in retort 30 is burned. When the dehydrated material is to be used as a fertilizer the said dehydrated material is discharged from retort 30 by means of the door 43.

The first step in my process is to apply filtering material or medium on a rotating or traveling screen for the purification of raw sewage or untreated liquid. This consists of spreading crushed limestone, sand, granulated mineral or other suitable material in a layer over said moving screen.
Where chemical treatment for further purification of the water is used, the chemical is mixed with the filtering medium before being spread on the screen and the water passing through the medium dissolves the chemical to make a more thorough mixture than when the chemical is poured into the water.

The filtering medium is graded to the size of screen mesh so as to be retained and a layer spread on the screen to the desired thickness. The sewage flowing against the submerged portion of the slowly moving screen deposits the floating and suspended solids on the filtering medium and the clarified water passes through said medium and screen.
With the plain screen the side entering the sewage stream being clean and the side leaving the stream being clogged with solids, the tendency of the water is to flow to the entering side to carry a large percentage of the finer materials through. The use of a filtering medium prevents the clogging of the screen while furnishing a means for collecting the finer solids as there is no direct flow of the water through said filtering medium.
The slow movement of the screen gently raises the solids above the flow line of the sewage and the brushes remove the top of the filtering medium to the desired depth together with the entrapped solids. The thickness of the top layer of the filtering medium removed by the brushes is automatically replaced from the feeding hopper and spreading blade. The total layer of medium can be varied depending on the conditions to be met as also the depth of layer removed from the screen. As, for instance, during a storm period when ordinarily the sewage would be by-passed entirely, the method is to lower the brushes to sweep off all or nearly all of the medium as the percentage of sewage in the water is greatly reduced from the flood of water.

The filtering medium used depends upon the method of treating the disposal of the sewage screenings and sludge.

The sewage solids together with the filtering medium is now fed into the incinerator retort, dried waste materials and rubbish fed into the fire chamber and burned at a comparatively low temperature to dehydrate the sewage. The moisture and odors are passed to a condenser. If then the dehydrated residue is to be used as a fertilizer it is removed from the retort and passed through an attrition or ball mill and pulverized for use.

When the dehydrated residue is to be burned, waste material is also burned in the second firing chamber and the smoke and gases are passed through the combustion chamber. The filtering material left in the retort after the sewage solids have been consumed is then used over again on the screen for collecting more sewage solids.

The use of a filtering material also has an important advantage besides obviating the clogging and wear on the screen, of collecting on the filtering medium a large percentage of the oil which formerly escaped, furnishing additional fuel to be burned in the incinerator.

It is estimated that ordinary domestic sewage is composed of approximately 99.9% water and 0.1% solids, and of the solids about 50% are in solution, 25% in suspension and 25% settleable. Owing to the high dilution a much larger percentage of the separable solids is collected by the use of a filtering medium in connection with the screening than by the screening alone.

My filtering and screening method is also adapted to take care of the sewage sludge from settling plants.

Figure 1:
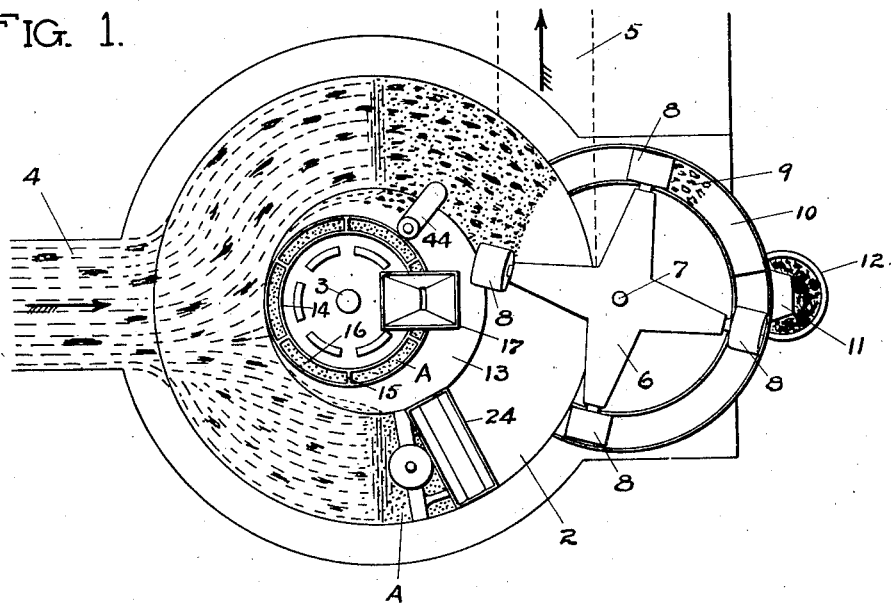
Figure 1 is a plan of a circular rotatable screen mounted in a sewage stream and with means for spreading and removing a filtering medium.

In sewage treatment plants where the sewage is clarified by use of settling tanks or clarifiers, two types of sludge are obtained, first the heavier solids which settle out in a preliminary tank and a final settling tank where the finer sludge is settled after passing through activating channels where it has been aerated. The settled solids from a preliminary settling tank can be pumped directly on to my filtering material on a movable screen as shown in Fig. 1, where the free water is drained and the resultant solids deposited in an ejector pot for treatment in an incinerator. The activated sludge or final settlings from an activated plant is an entirely different sludge from the settled solids and in most cases in order to disperse the water content it is necessary to first treat this activated sludge by chemicals before it is possible to free the particles from the water when spread on a screen or on the filtering medium. When depositing or spreading activated sludge on a plain screen it blankets and plugs the screen. By using a filtering medium as I do the top layer with the blanketing film is continuously removed and a new layer of filtering medium laid to present a new and clean surface. The chemical I use on activated sludge is chlorine either in the form of a liquid or as a bleaching powder and has the effect of causing the sludge to separate from the entrained water and allowing the water to settle through the filtering medium and pass freely through the screen.

It will be understood that chlorine is used to disinfect the water when necessary after the solids are taken from sewage by the screen method or by settling, but I have discovered that treating the activated sludge with chlorine before passing it onto the filtering medium and screens precipitates the fine particles and allows the water to pass away.

The brushes on a screen will sweep away the solid materials from the surface but some of the solids and a sludge especially will clog the slots through the screen in spite of the brushing. By the use of a filtering medium this trouble is obviated as the solids are removed with the top layer of the medium until such time as it is necessary to remove all medium when the brushes are lowered and sweep it all off and again raised to remove the depth of top layer desired.

Having thus described my process what I claim is:

1. The herein described process for clarification of a sewage stream which includes continuously depositing a granulated filtering medium on the dry portion of a screen which is subjected only to atmospheric pressure and which is partially submerged to intercept said stream, leveling said filtering medium to the thickness desired and retained on said screen by gravity, rotating said screen to submerge said leveled medium from one side of said stream to intercept said stream and collect sewage solids in said medium by the gravity flow of said stream through said medium, emerging said medium from the opposite side of said stream, continuously collecting said medium through a continuous cycle of operations which consists of collecting first a top layer of said medium through several rotations of the screen and second collecting the total layer of said medium.

2. The herein described process for clarification of a sewage stream which flows by gravity through a portion of a medium on a perforated screen and which includes chemically treating a granulated filtering medium, depositing said medium on to said screen, leveling said filtering medium to a predetermined depth and which is retained on said screen by gravity, rotating said medium at a small horizontal angle to progressively submerge said medium at one side of said stream to intercept said stream and collect sewage solids in said medium by the gravity flow of said stream through said medium, emerging said medium at the opposite side of said stream, continuously collecting said medium through a cycle of operations which consists of collecting first a top layer of said medium through several rotations of said medium and second collecting the total layer of medium on said screen.

3. The herein described process for clarification of a sewage stream which flows by gravity through a portion of a medium on a perforated screen and a portion of a medium back of a perforated screen and which includes depositing a granulated filtering medium onto a portion of said screen outside of said stream, depositing a granulated filtering medium back of a portion of said perforated screen, progressively submerging said medium to flow said sewage stream by gravity through the medium and screen of one portion and through the screen and medium of another portion, progressively emerging said medium from the stream, continuously collecting first a layer of medium on said screen and replacing a like amount of medium and second collecting the total amount of medium on said screen and replacing an equal total amount and removing and depositing medium back of said screen as occasion requires.

4. The herein described process for clarification of sewage the liquid part of which flows by gravity through a filtering medium on a perforated screen and which includes depositing a granulated filtering medium on a perforated screen, continuously rotating said medium at a small horizontal angle to perform a cycle of operations which consists of leveling said filtering medium to a predetermined depth of material which is retained by gravity on said screen, depositing sewage on a portion of said medium to flow the liquid by gravity through said medium, continuously collecting the deposited solids of said sewage with a layer of medium, returning the remaining portion of filtering medium on said screen to the place to deposit and replace the amount of medium collected, depositing sewage solids on said new layer of medium until it is necessary to remove all medium when the total amount of medium on the screen is collected to repeat said cycle.

JOHN SCHAAF.